Nov. 25, 1958  P. O. BOBO ET AL  2,862,173
OVER-CURRENT LIMIT DEVICES
Filed May 31, 1955  2 Sheets-Sheet 1

WITNESSES
Edwin E. Bassler
K. W. Thomas

INVENTORS
Powell O. Bobo &
James T. Carleton
BY
Ezra W. Savage
ATTORNEY

Nov. 25, 1958 P. O. BOBO ET AL 2,862,173
OVER-CURRENT LIMIT DEVICES
Filed May 31, 1955 2 Sheets-Sheet 2

United States Patent Office 2,862,173
Patented Nov. 25, 1958

2,862,173

OVER-CURRENT LIMIT DEVICES

Powell O. Bobo, Pittsburgh, Pa., and James T. Carleton, Glen Burnie, Md., assignors to Westinghouse Electric Corporation, East Pittsburgh, Pa., a corporation of Pennsylvania Application May 31, 1955, Serial No. 511,926

7 Claims. (Cl. 322—25)

This invention relates to over-current limit devices for dynamo-electric machines and more particularly to over-current limit devices which vary the magnitude of their limit in accordance with the magnitude of the terminal voltage of the dynamo-electric machine.

An over-current limit device is provided for a dynamo-electric machine in order to prevent the associated regulator from driving the magnitude of the machine's field winding voltage up to such an extent that the thermal limits of the machine are exceeded. Heretofore, many types of over-current limit devices have been provided. Some of these over-current limit devices provide a constant limit value, that is one that does not vary in accordance with the terminal voltage of the dynamo-electric machine. Thus, under transient conditions when the terminal voltage of the dynamo-electric machine decreases to a considerably lower value, the over-current limit device over-rides the associated regulator and prevents the regulator from restoring the terminal voltage of the machine to the regulated value. Under these transient conditions the thermal limits of the dynamo-electric machine would not be necessarily exceeded if the regulator were permitted to at least partially restore the machine's terminal voltage. Therefore, it is desirable to provide an over-current limit device for a dynamo-electric machine which provides a limit that varies in accordance with the terminal voltage of the machine, to thus permit under transient conditions the associated regulator to at least partially restore the terminal voltage to its regulated value. It is also desirable to accomplish this result by means of an over-current limit device which comprises static components.

It is an object of this invention to provide a new and improved over-current limit device for a dynamo-electric machine.

A more specific object of this invention is to provide a variable over-current limit for a dynamo-electric machine so that under transient conditions the terminal voltage of the machine can be partially restored by increasing the magnitude of the over-current limit in accordance with the change in the terminal voltage.

Other objects of this invention will become apparent from the following description when taken in conjunction with the accompanying drawings, in which.

Figure 1:
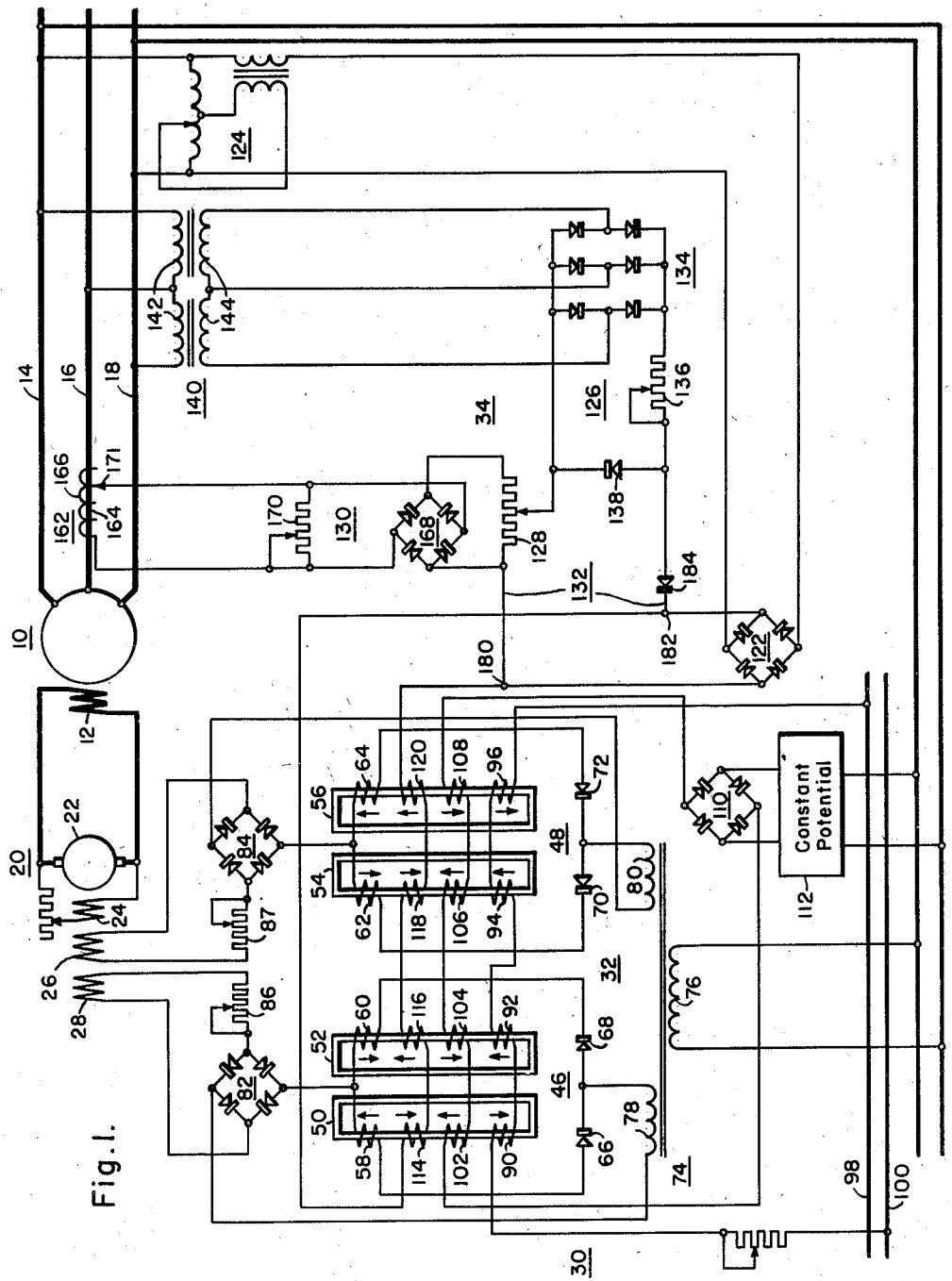
Figure 1 is a schematic diagram of apparatus and circuits illustrating this invention.

Referring to Figure 1, there is illustrated a dynamo-electric machine, specifically a synchronous condenser 10, having a field winding 12. In this instance, the synchronous condenser 10 is disposed to supply reactive power to line conductors 14, 16 and 18 which are a part of a three-phase electrical system. In order to obtain an excitation voltage across the field winding 12 of relatively large magnitude, an exciter 20 is provided. In this instance, the exciter 20 comprises an armature 22 which supplies current to the field winding 12 of the synchronous condenser 10, a self-exciting winding 24 which is connected in shunt with the armature 22 and buck and boost field windings 26 and 28, respectively, the purpose of which will be explained hereinafter. In order to maintain the output voltage of the synchronous condenser 10 substantially constant, a regulator loop 30, comprising a push-pull magnetic amplifier 32, is interconnected between the output of the synchronous condenser 10 and the buck and boost field windings 26 and 28 of the exciter 20.

An over-current limit device 34 for controlling the reactive component of current of a dynamo-electric machine is connected to the output of the synchronous condenser 10 and cooperates with the push-pull magnetic amplifier 32, of the regulator loop 30, to prevent the regulator loop 30 from increasing the voltage across the field winding 12 of the synchronous condenser 10 to such a value as to exceed the thermal limits of the synchronous condenser 10. For purposes of clarity, the components and operation of the regulator loop 30 will be described before describing the various components and operation of the over-current limit device 34.

As illustrated, the push-pull magnetic amplifier 32 is of standard construction and comprises two main sections 46 and 48. The section 46 comprises two magnetic core members 50 and 52, and the section 48 comprises two magnetic core members 54 and 56. In this instance, load windings 58, 60, 62 and 64 are disposed in inductive relationship with the magnetic core members 50, 52, 54 and 56, respectively. As is customary, self-saturation for the magnetic amplifier 32 is obtained by connecting in series circuit relationship with the load windings 58, 60, 62 and 64 self-saturating rectifier 66, 68, 70 and 72, respectively.

In order to form a doubler circuit of the section 46, the series circuit including the load winding 58 and the self-saturating rectifier 66 is connected in parallel circuit relationship with the series circuit including the load winding 60 and the self-saturating rectifier 68. In like manner, in order to form a doubler circuit of the section 48, the series circuit including the load winding 62 and the self-saturating rectifier 70 is connected in parallel circuit relationship with the series circuit including the load winding 64 and the self-saturating rectifier 72.

Energy for the load windings 58, 60, 62 and 64, of the magnetic amplifier 32, is received from a transformer 74 having a primary winding 76, which in this instance is responsive to the output voltage of the synchronous condenser 10, and secondary winding sections 78 and 80. As illustrated, a full-wave dry-type load rectifier 82 is interconnected with the hereinbefore described parallel circuit of the section 46, and with the secondary winding section 78, of the transformer 74, in order to produce a direct-current output for the section 46. In like manner, a full-wave dry-type load rectifier 84 is interconnected with the hereinbefore described parallel circuit of the section 48, and with the secondary winding section 80, of the transformer 74, in order to obtain a direct-current output for the section 48.

In this instance, the boost field winding 28 of the exciter 20 is responsive to the output of the load rectifier 82 and the buck field winding 26 of the exciter 20 is responsive to the output of the load rectifier 84. In operation, the buck field winding opposes the boost field winding 28. In order to provide means for changing the gain in the regulator loop 30, variable resistors 86 and 87 are connected in series circuit relationship with the boost field winding 28 and with the buck field winding 26, respectively.

For the purpose of biasing each of the sections 46 and 48 of the magnetic amplifier 32 to approximately half its output, bias windings 90, 92, 94 and 96 are disposed in inductive relationship with the magnetic core members 50, 52, 54 and 56, respectively. In particular, the bias windings 90, 92, 94 and 96 are connected in series circuit relationship with one another, the series circuit being connected to conductors 98 and 100 which have applied thereto a substantially constant direct-current voltage. In operation, the current flow through the bias windings 90, 92, 94 and 96 produces a magnetomotive force with respect to their respective magnetic core members that opposes the magnetomotive force produced by the current flow through the load windings 58, 60, 62 and 64, respectively.

In order to obtain a reference point from which to operate from in each of the sections 46 and 48 of the magnetic amplifier 32, reference windings 102, 104, 106 and 108 are disposed in inductive relationship with the magnetic core members 50, 52, 54 and 56, respectively. The reference windings 102, 104, 106 and 108 are so disposed on their respective magnetic core members 50, 52, 54 and 56 that the current flow through the reference windings 102, 104 produces a magnetomotive force that opposes the magnetomotive force produced by the respective bias windings 90 and 92, and that the current flow through the reference windings 106 and 108 produces a magnetomotive force that is additive to the magnetomotive force produced by the respective bias windings 94 and 96. As illustrated, the reference windings 102, 104, 106 and 108 are connected in series circuit relationship with one another, the series circuit being connected to the output terminals of a full-wave dry-type rectifier 110. In order that the current flow through the reference windings 102, 104, 106 and 108 remains substantially constant, the input terminals of the rectifier 110 are connected to a constant potential device 112 which produces at its output a substantially constant alternating current irrespective of the magnitude of the output voltage of the synchronous condenser 10, to which the constant potential device 112 is responsive.

Control windings 114, 116, 118 and 120 are disposed in inductive relationship with the magnetic core members 50, 52, 54 and 56, respectively. The control windings 114, 116, 118 and 120 are connected in series circuit relationship with one another, the series circuit being connected to the output terminals of a full-wave dry-type rectifier 122. The input terminals of the rectifier 122 are connected to the line conductors 14 and 18 through a variable transformer 124. A very small change in the magnitude of the current flow through the control windings 114, 116, 118 and 120 can be obtained by adjusting the variable transformer 124.

The control windings 114, 116, 118 and 120 are so disposed on their respective magnetic core members 50, 52, 54 and 56 that when current flows therethrough a magnetomotive force is produced in the respective magnetic core members that opposes the magnetomotive force produced by the current flow through the respective reference windings 102, 104, 106 and 108. The output voltage of the synchronous condenser 10 is at its regulated value when the magnetomotive forces produced by the current flow through the control windings 114, 116, 118 and 120 are equal to the respective magnetomotive forces produced by the current flow through the reference windings 102, 104, 106 and 108.

In operation, when the output voltage of the synchronous condenser 10 increases to a value above its regulated value, the current flow through the control windings 114, 116, 118 and 120 increases to thereby decrease the output current from the section 46 of the amplifier 32 and increase the output current from the section 48 of the push-pull magnetic amplifier 32. Such an action increases the current flow through the buck field winding 26 of the exciter 20 and decreases the current flow through the boost field winding 28 to thereby decrease the output voltage of the exciter 20. A decrease in the output voltage of the exciter 20 decreases the magnitude of the voltage across the field winding 12 of the synchronous condenser 10 to thereby return the output voltage of the synchronous condenser 10 to its regulated value.

On the other hand, a decrease in the output voltage of the synchronous condenser 10 to a value below its regulated value decreases the magnitude of the current flow through the control windings 114, 116, 118 and 120. A decrease in the current flow through the control windings 114, 116, 118 and 120 unbalances the push-pull magnetic amplifier 32 in such a direction that the output current from the section 46 of the amplifier 32 increases and the output current from the section 48 decreases. Such an action increases the magnitude of the current flow through the boost field winding 28 of the exciter 20 and decreases the magnitude of the current flow through the buck field winding 26. This, in turn, increases the magnitude of the output voltage of the exciter 20 as well as the magnitude of the voltage across the field winding 12 of the synchronous condenser 10, to thereby return the magnitude of the output voltage of the synchronous condenser 10 to its regulated value.

The over-current limit device 34 will now be described. Broadly, the over-current limit device 34 comprises circuit means, specifically a non-linear device 126, whose external voltage-current characteristic varies in accordance with the terminal voltage of the synchronous condenser 10; an impedance member, specifically an adjustable resistor 128; circuit means 130 for producing across the adjustable resistor 128 a direct-current voltage which is directly proportional to the armature current of the synchronous condenser 10; and circuit means 132 for comparing the net direct-current voltage across the adjustable resistor 128 and the non-linear device 126 with a direct-current measure of the terminal voltage of the synchronous condenser 10, as it appears at the output of the rectifier 122, and for preventing current from flowing from the output of the rectifier 122 through the non-linear device 126 and the adjustable resistor 128 when the direct-current voltage measure of the terminal voltage is of greater magnitude than the net direct-current voltage across the non-linear device 126 and the adjustable resistor 128.

In particular, the non-linear device 126 comprises a three-phase dry-type rectifier 134 having an input and an output; an adjustable impedance member, specifically an adjustable resistor 136, connected in series circuit relationship with the output of the rectifier 134; and unilateral conducting means, specifically a rectifier 138, connected in parallel circuit relationship with the series circuit including the adjustable resistor 136 and the rectifier 134, the rectifier 138 being poled to prevent the flow of current from the adjustable resistor 128.

In order to vary the external voltage-current characteristic of the non-linear device 126 in accordance with the terminal voltage of the synchronous condenser 10, the input of the rectifier 134 is rendered responsive to the terminal voltage of the synchronous condenser 10. Specifically, a step-down potential transformer 140, having a primary winding 142 and a secondary winding 144, is provided, the primary winding 142 being connected to the line conductors 14, 16 and 18, and the secondary winding 144 being connected to the input of the rectifier 134.

Figure 4:
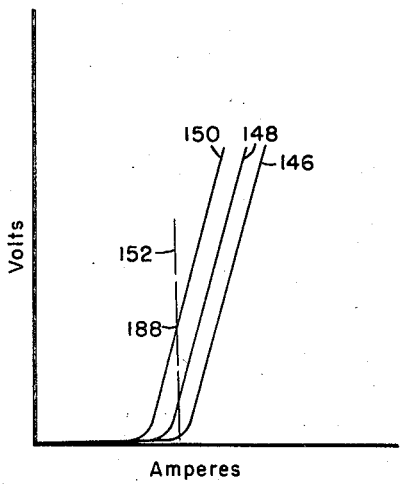
Fig. 4 is a graph illustrating the external voltage-current characteristics of the non-linear device shown in Fig. 1 for various values of terminal voltage of the synchronous condenser.

Referring to Fig. 4, a curve 146 represents the external voltage-current characteristic for the non-linear device 126 when the terminal voltage of the synchronous condenser 10 is at its regulated voltage, namely 115 volts. However, assuming the terminal voltage of the synchronous condenser 10 decreases to a lower value such as 110 volts then the external voltage-current characteristic for the non-linear device 126 is as represented by a curve 148. Assuming the terminal voltage of the synchronous condenser 10 decreases still further to a value such as 100 volts then the external voltage-current characteristic for the non-linear device 126 is as represented by a curve 150. As can be seen from a vertical line 152 shown in Fig. 4, the voltage drop across the non-linear device 126 increases with a decrease in the terminal voltage of the synchronous condenser 10 below its regulated value. The manner in which this characteristic of the non-linear device 126 functions to provide an over-current limit for the synchronous condenser 10 which varies in accordance with the terminal voltage of the synchronous condenser 10 will be described hereinafter.

The curves 146, 148 and 150 shown in Fig. 4 are for a relatively high resistance value for the adjustable resistor 136 of the non-linear device 126. On the other hand, curves 154, 156 and 158 corresponding to the curves 146, 148 and 150, respectively, represent the external voltage-current characteristics of the non-linear device 126 when its adjustable resistor 136 has a much lower value of resistance than in the case of Fig. 4. As can be seen from Fig. 5, the voltage drop across the non-linear device 126 for the same current input thereto as represented by a line 160 and for the same terminal voltage for the synchronous condenser 10 is not as great as was the case in Fig. 4 where the resistance value for the adjustable resistor 136 was of greater magnitude.

The circuit means 130 for providing a direct-current voltage across the adjustable resistor 128, which is directly proportional to the armature current of the synchronous condenser 10, comprises a current transformer 162 having a primary winding 164 and a secondary winding 166, the current transformer 162 being responsive to the current flow through the line conductor 16; a full-wave dry-type rectifier 168 for rectifying the alternating-current voltage across the secondary winding 166 of the current transformer 162, the input of the rectifier 168 being connected to the secondary winding 166 and the output of the rectifier 168 being connected to the adjustable resistor 128; and an adjustable resistor 170 connected across the input of the rectifier 168 so as to enable the use of a smaller rectifier 168. It is to be understood that in practice the current transformer 162 can be associated with any one of the three line conductors 14, 16 or 18.

Figure 2:
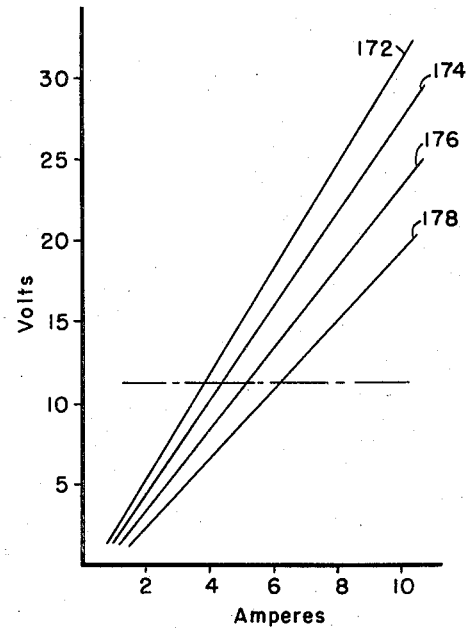
Fig. 2 is a graph illustrating the manner in which the voltage across a resistor, which is responsive to the armature current of the synchronous condenser in Fig. 1, varies with changes in the armature current.

In Fig. 2, the manner in which the direct-current voltage across the adjustable resistor 128 varies with changes in the magnitude of the armature current of the synchronous condenser 10 for various settings of the adjustable tap 171 of the secondary winding 166 is represented by curves 172, 174, 176 and 178. As can be seen from the curves 172, 174, 176 and 178, the direct-current voltage across the adjustable resistor 128 varies in direct proportion to changes in the magnitude of the armature current of the synchronous condenser 10.

The adjustable resistor 128 is connected in series circuit relationship with the rectifier 138, the series circuit being connected to points 180 and 182 through a blocking rectifier 184 which comprises a part of the circuit means 132 and which functions to prevent the flow of current from the output of the rectifier 122 through the rectifier 138 and the adjustable resistor 128 when the direct-current voltage between the points 180 and 182, as produced from the output of the rectifier 122, is of greater magnitude than the net direct-current voltage across the series circuit including the adjustable resistor 128 and the rectifier 138.

The operation of the over-current limit device 34 will now be described. Assuming the terminal voltage of the synchronous condenser 10 and its armature voltage are such that the magnitude of the direct-current voltage across the points 180 and 182, as produced from the output of the rectifier 122, is of greater magnitude than the net direct-current voltage across the series circuit including the adjustable resistor 128 and the rectifier 138, then the field winding 12 of the synchronous condenser 10 is under the control of the regulator loop 30 and the over-current limit device 34 has substantially no effect on the system. However, assuming the armature current of the synchronous condenser 10 increases to a higher value and the terminal voltage of the synchronous condenser 10 is such that the net direct-current voltage across the series circuit including the adjustable resistor 128 and the rectifier 138 is of greater magnitude than the magnitude of the direct-current voltage across the points 180 and 182, as produced from the output of the rectifier 122, then the over-current limit device 34 takes over and supplies current to the control windings 114, 116, 118 and 120 of the magnetic amplifier 32. However, the limit value for the over-current limit device 34 is not reached until the voltage across the adjustable resistor 128 effects sufficient current flow through the control windings 114, 116, 118 and 120 to produce magnetomotive forces which are equal and opposite to the magnetomotive forces produced by the current flow through the respective reference windings 102, 104, 106 and 108.

Figure 3:
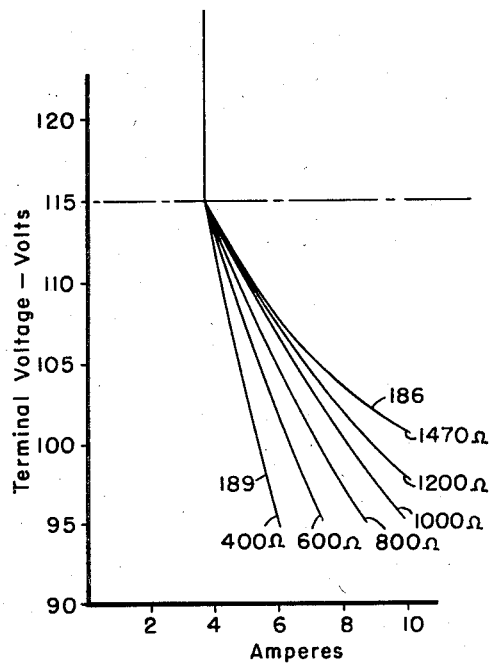
Fig. 3 is a graph illustrating the over-current limit characteristics of the over-current limit device shown in Fig. 1 for various values of resistance in a non-linear device which comprises a part of the over-current limit device of Fig. 1.

In Fig. 3 a curve 186 represents the over-current limit characteristic for the over-current limit device 134 when the adjustable resistor 136 is so adjusted as to have a high value of resistance such as was referred to with reference to the curves shown in Fig. 4. In Fig. 3 the ordinate is terminal voltage of the synchronous condenser 10 and the abscissa is the output current from the secondary winding 166 of the current transformer 162.

As can be seen from the curve 186 of Fig. 3, with a decrease in the terminal voltage of the synchronous condenser 10 it takes a greater magnitude of synchronous condenser armature current to bring the limiting action into effect. The reason for this can be seen from the curves 146, 148 and 150 of Fig. 4. For instance, when the terminal voltage of the synchronous condenser 10 is at its regulated value of 115 volts there is substantially no voltage drop across the non-linear device 126 as effected by the current flow from the adjustable resistor 128. However, if the terminal voltage of the synchronous condenser 10 decreases to a voltage such as 100 volts due to a transient condition on the system, the voltage drop, as shown by the curve 150 of Fig. 4, increases to a point 188 if the input current to the non-linear device 126 is as represented at 152, to thereby decrease the net direct-current voltage across the series circuit including the adjustable resistor 128 and the rectifier 138. With such a decrease in the net direct-current voltage across the series circuit, including the adjustable resistor 128 and the rectifier 138, it takes a greater magnitude of direct-current voltage across the adjustable resistor 128 to overcome the direct-current voltage between the points 180 and 182 as produced from the output of the rectifier 122 and effect sufficient current flow through the control windings 114, 116, 118 and 120 to produce magnetomotive forces of equal and opposite magnitude to the magnetomotive forces produced by the current flow through the respective reference windings 102, 104, 106 and 108. When the armature current of the synchronous condenser 10 is such as to effect this latter action of equal and opposite magnetomotive forces, the over-current limit value has been reached and the system in effect then regulates for this value of armature current of the synchronous condenser 10.

Figure 5:
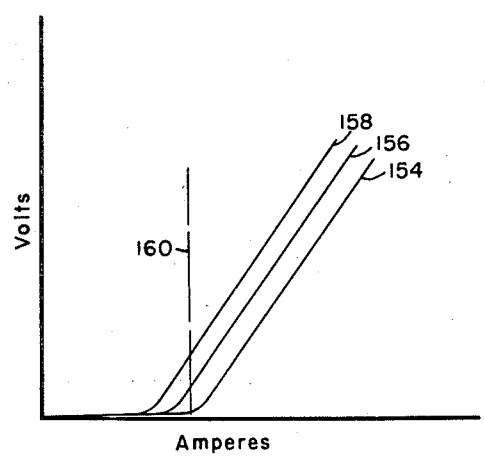
Fig. 5 is a graph illustrating the effect of decreasing the resistance in the non-linear circuit shown in Fig. 1.

If, as was the case in Fig. 5, the adjustable resistor 136 is adjusted so as to have a lower resistance value such as represented by the over-current limit characteristic curve 189 shown in Fig. 3, then, as can be seen from Fig. 5, the voltage drop across the non-linear device 126 for the same value of input current is not as great and, therefore, the net direct-current voltage across the series circuit including the adjustable resistor 128 and the rectifier 138 is greater and, therefore, the over-current limit device 34 overcomes the regulator loop 30 with a lesser magnitude of direct-current voltage across the adjustable resistor 128.

It is to be understood that the foregoing description is based on the operation of dynamo-electric machine 10 in its over-excited region.

The apparatus embodying the teachings of this invention has several advantages. For instance, the over-current limit device 34 shown in Fig. 1 provides a limit which varies in accordance with the terminal voltage of the synchronous condenser 10 and thus permits the regulator loop 30 to at least partially restore the terminal voltage of the synchronous condenser 10 should it decrease considerably below the regulated value under transient conditions. In addition, the over-current limit device 34 comprises static components and thus requires a minimum of maintenance.

Since numerous changes may be made in the above-described apparatus and circuits, and different embodiments of the invention may be made without departing from the spirit and scope thereof, it is intended that all the matter contained in the foregoing description or shown in the accompanying drawings shall be interpreted as illustrative and not in a limiting sense.

We claim as our invention:

1. In a control system for a dynamo-electric machine having a field winding, the combination comprising, a non-linear circuit, means for changing the voltage-current characteristic of the non-linear circuit in accordance with the terminal voltage of the dynamo-electric machine, an impedance member, means for producing across the impedance member a voltage which varies in accordance with the current of the dynamo-electric machine, means for connecting the non-linear device in series circuit relationship with the impedance member, circuit means for comparing a measure of the terminal voltage of the dynamo-electric machine with the voltage across said series circuit, and further circuit means for controlling the field winding of the dynamo-electric machine in accordance with the larger of said compared voltages, to thereby provide an over-current limit for the dynamo-electric machine which varies with the terminal voltage of said dynamo-electric machine.

2. In a control sysem for a dynamo-electric machine having a field winding, the combination comprising, a non-linear device including means responsive to the terminal voltage of the dynamo-electric machine for effecting a direct-current voltage which varies in accordance with the terminal voltage of the dynamo-electric machine, an impedance member connected in series circuit relationship with said means, and unilateral conducting means connected in parallel circuit relationship with said series circuit, another impedance member, means for producing across said another impedance member a voltage which varies in accordance with the current of the dynamo-electric machine, circuit means for connecting the said another impedance member in series circuit relationship with the unilateral conducting means, said unilateral conducting means being poled to prevent the flow of current from said another impedance member, other circuit means for comparing a measure of the terminal voltage of the dynamo-electric machine with the voltage across the latter mentioned series circuit, and further circuit means for controlling the field winding of the dynamo-electric machine in accordance with the larger of said compared voltages, to thereby provide an over-current limit for the dynamo-electric machine which varies with the terminal voltage of said dynamo-electric machine.

3. In a control system for a dynamo-electric machine having a field winding, the combination comprising, a non-linear device including a rectifier having an input and an output, the input of the rectifier being responsive to the terminal voltage of the dynamo-electric machine, an impedance member, means for connecting the impedance member in series circuit relationship with the output of the rectifier, and unilateral conducting means connected in parallel circuit relationship with said series circuit, another impedance member, means for producing across said another impedance member a direct-current voltage which varies in accordance with the current of the dynamo-electric machine, circuit means for connecting the said another impedance member in series circuit relationship with the unilateral conducting means, said unilateral conducting means being poled to prevent the flow of current from said another impedance member, other circuit means for comparing a measure of the terminal voltage of the dynamo-electric machine with the voltage across the latter mentioned series circuit, and further circuit means for controlling the field winding of the dynamo-electric machine in accordance with the larger of said compared voltages, to thereby provide an over-current limit for the dynamo-electric machine which varies with the terminal voltage of said dynamo-electric machine.

4. In a control system for a dynamo-electric machine having a field winding, the combination comprising, a non-linear device including a rectifier having an input and an output, the input of the rectifier being responsive to the terminal voltage of the dynamo-electric machine, an impedance member, means for connecting the impedance member in series circuit relationship with the output of the rectifier, and unilateral conducting means connected in parallel circuit relationship with said series circuit, another impedance member, means for producing across said another impedance member a direct-current voltage which varies in accordance with the current of the dynamo-electric machine, circuit means for connecting the said another impedance member in series circuit relationship with the unilateral conducting means with the unilateral conducting means poled to prevent the flow of current from the said another impedance member, and other circuit means for comparing a direct-current measure of the terminal voltage of the dynamo-electric machine with the direct-current voltage across the latter mentioned series circuit and for rendering the field winding of the dynamo-electric machine responsive to the larger of said compared voltages, to thereby provide an over-current limit for the dynamo-electric machine which varies with the terminal voltage of said dynamo-electric machine.

5. In a control system for a dynamo-electric machine having a field winding, the combination comprising, a non-linear device including a rectifier having an input and an output, the input of the rectifier being responsive to the terminal voltage of the dynamo-electric machine, a variable impedance member, means for connecting the variable impedance member in series circuit relationship with the output of the rectifier, and unilateral conducting means connected in parallel circuit relationship with said series circuit, another impedance member, means for producing across said another impedance member a direct-current voltage directly proportional to the current of the dynamo-electric machine, circuit means for connecting the said another impedance member in series circuit relationship with the unilateral conducting means with the unilateral conducting means poled to prevent the flow of current from the said another impedance member, a magnetic amplifier having a control winding and being connected to control the field winding of the dynamo-electric machine, other circuit means for comparing a direct-current measure of the terminal voltage of the dynamo-electric machine with the direct-current voltage across the latter mentioned series circuit and for preventing current as effected by said direct-current measure of the terminal voltage from flowing through said latter mentioned series circuit when the direct-current voltage thereacross is of lesser magnitude than the magnitude of the said direct-current measure of the terminal voltage of the dynamo-electric machine, and further circuit means for rendering said control winding responsive to larger of said compared voltages, to thereby provide an over-current limit for the dynamo-electric machine which varies with the terminal voltage of said dynamo-electric machine.

6. In combination, a regulator loop for maintaining the terminal voltage of a dynamo-electric machine at substantially a regulated value, first means connected in circuit relationship with said regulator loop for limiting the over-current of said dynamo-electric machine, second means connected in circuit relationship with said first means for varying the limiting action of said first means in accordance with the terminal voltage of said dynamo-electric machine, the limiting action of said first means being effective for greater magnitudes of current when the terminal voltage of said dynamo-electric machine is less than said regulated value.

7. In combination, a regulator loop for maintaining the output terminal voltage of a dynamo-electric machine having a field winding at substantially a regulated value, first means for obtaining a first output voltage which is proportional to the armature current of said dynamo-electric machine, a non-linear circuit connected in circuit relationship with said dynamo-electric machine for obtaining a second output voltage which varies with the terminal voltage of said dynamo-electric machine, second means for comparing said first and second output voltages to obtain a net voltage, third means connected in circuit relationship with said regulator system for obtaining a measure of the terminal voltage of said dynamo-electric machine, fourth means for comparing said measure of the terminal voltage with said net voltage, and fifth means connected in circuit relationship with said fourth means and said regulator loop for preventing said regulator loop from raising said terminal voltage when said net voltage is of greater magnitude than said measure of said terminal voltage to thereby provide an overcurrent limit for the dynamo-electric machine which varies with the terminal voltage of said dynamo-electric machine.

References Cited in the file of this patent

UNITED STATES PATENTS

| | | |
|---|---|---|
| 2,576,647 | Sikorra | Nov. 27, 1951 |
| 2,719,259 | Miner | Sept. 27, 1955 |
| 2,757,332 | Carleton et al. | July 31, 1956 |